US009442962B1

(12) United States Patent
Moore

(10) Patent No.: US 9,442,962 B1
(45) Date of Patent: Sep. 13, 2016

(54) METHOD AND APPARATUS FOR CREATING RFC-2307-COMPLIANT ZONE RECORDS IN AN LDAP DIRECTORY WITHOUT SCHEMA EXTENSIONS

(75) Inventor: Paul Moore, Mercer Island, WA (US)

(73) Assignee: CENTRIFY CORPORATION, Santa Clara, CA (US)

( * ) Notice: Subject to any disclaimer, the term of this patent is extended or adjusted under 35 U.S.C. 154(b) by 1394 days.

(21) Appl. No.: 11/657,165

(22) Filed: Jan. 23, 2007

(51) Int. Cl.
*G06F 17/30* (2006.01)

(52) U.S. Cl.
CPC .............................. *G06F 17/30286* (2013.01)

(58) Field of Classification Search
CPC .. G06F 21/6218; G06F 21/31; G06F 3/1222; G06F 17/30011; G06F 2221/2141
USPC .......................................................... 707/100
See application file for complete search history.

(56) References Cited

U.S. PATENT DOCUMENTS

| | | | |
|---|---|---|---|
| 6,507,849 B1* | 1/2003 | Choudhary | 707/103 Y |
| 6,981,043 B2* | 12/2005 | Botz et al. | 709/225 |
| 7,171,411 B1* | 1/2007 | Lewis et al. | |
| 7,467,230 B2* | 12/2008 | Majumdar et al. | 709/245 |
| 7,590,622 B2* | 9/2009 | Silverbrook et al. | 707/3 |
| 7,668,871 B1* | 2/2010 | Cai et al. | 707/609 |
| 8,126,916 B2* | 2/2012 | Bauman et al. | 707/781 |
| 2002/0103811 A1* | 8/2002 | Fankhauser et al. | 707/104.1 |
| 2002/0143909 A1* | 10/2002 | Botz et al. | 709/223 |
| 2004/0054808 A1* | 3/2004 | Ekberg | 709/245 |
| 2004/0205055 A1* | 10/2004 | Overton et al. | 707/3 |
| 2005/0033777 A1* | 2/2005 | Moraes | G06F 17/30575 |
| 2005/0044423 A1* | 2/2005 | Mellmer et al. | 713/201 |
| 2005/0246205 A1* | 11/2005 | Wang et al. | 705/3 |
| 2006/0129570 A1* | 6/2006 | Moore | 707/100 |
| 2007/0041556 A1* | 2/2007 | Rana et al. | 379/218.01 |
| 2008/0059475 A1* | 3/2008 | Rowley | 707/10 |

OTHER PUBLICATIONS

J. Futagawa, "Integrating Network Services of Windows and UNIX for Single Sign-on", Proceedings of the 2004 International Conference on Cyberworlds (CW'04), pp. 323-328, Nov. 2004, Tokyo, Japan.*

* cited by examiner

*Primary Examiner* — Angelica Ruiz
(74) *Attorney, Agent, or Firm* — Blakely Sokoloff Taylor & Zafman LLP

(57) ABSTRACT

A global user record that can be found in a search for posixAccount-type records is created in a database, then a zone user record of a type that cannot be found in a search for posixAccount-type records is associated with it. Finally, the zone user record is augmented so that it, too, will be found in a search for posixAccount-type records. Global and zone-specific group records are created similarly.

9 Claims, 5 Drawing Sheets

METHOD AND APPARATUS FOR CREATING RFC-2307-COMPLIANT ZONE RECORDS IN AN LDAP DIRECTORY WITHOUT SCHEMA EXTENSIONS

FIELD

The invention relates to providing computer directory services. More specifically, the invention relates to maintaining multiple sets of identity data that satisfy common computer industry standards.

BACKGROUND

Entities on a computer network such as computers, computers users, and groups of users use network identity data about each other to perform standard network activities. Computer networks typically provide this data through a data server called a directory server. A directory server maintains a database of records that contain identity data about network entities: a user record with a user's name, password, access permissions, and contact information, for example, or a computer record with a computer's Internet Protocol ("IP") address and name. Network entities send requests for information to a directory server, which responds with the requested information. Requesting entities are called directory clients.

The computer industry has established various standards to ensure conformity and interoperability between computers on a network, and between networks of computers. One of the most widely-used standards for dealing with identity data is the Lightweight Directory Access Protocol ("LDAP"). The basic LDAP protocol is defined in a group of Internet Engineering Task Force ("IETF") Request for Comments ("RFC") documents; various aspects of the current version of the protocol (version 3) are described in RFCs listed in the "LDAP Technical Specification Road Map" (RFC4510, published June 2006). The databases reachable through LDAP may contain any sort of data, but most commonly contain identity, contact and authorization information for people, computers and organizations.

LDAP presents a hierarchical view of the data in a database. Records are presented as a tree of entries, each identified by a Distinguished Name ("DN") and each containing one or more attributes. Attributes consist of an attribute description (an attribute type with zero or more options) and one or more values. For example, an LDAP directory entry might have a "postalAddress" attribute, and its value might be a text string that can be used to send physical correspondence to the subject of the record. An entry generally has a parent or "superior" entry, and may have one or more child or "inferior" entries. Note that the data in the database need not be stored in this hierarchical structure; an LDAP server need only present the impression of such a structure to its clients.

An LDAP server responds to commands from an LDAP client. For example, a client may create a new entry, delete an entry, rename an entry, modify an entry, or (most commonly) retrieve the attributes in an entry. An LDAP client may submit a "search" command seeking a record of a particular type that matches (or contains) certain attribute-value pairs. The LDAP server searches through its hierarchy and may return the requested data if it can be found.

The types of records an LDAP directory server can store and retrieve are defined by an implicit or explicit schema of the server. The schema defines the attributes that may (or must) be present within each record type and the permissible relationships among record types. The types defined by a database schema are called classes. Classes may also have hierarchical interrelationships, so that (for example) a class that contains information about a user of a Unix or Unix-like computer may be subclass (a child or derived class) of a class that contains information about a user of any sort of computer. A database's schema provides a framework within which the database's records fit. The schema governs permissible contents of a data record and relationships between the records. For example, a schema may require that every record that identifies a person include a Social Security number or that every record having an Internet Protocol ("IP") address be associated with exactly one computer.

An LDAP directory schema describes a class's characteristics with respect to related classes. A class generally inherits characteristics from one parent class and may also inherit from one or more auxiliary classes. A class frequently defines additional new characteristics to supplement its inherited characteristics. A class that inherits characteristics from a parent class is called a child class of that parent class.

An LDAP server creates a new record by instantiating a class. That is, it creates a record whose attributes and relationships conform to the definitions and requirements of the class. Such a record is said to be of the class's type. A client requesting identity data from an LDAP server may specify a record type to search for. If the client asks for a record type that does not exist in the schema, the client's request will fail. It is important that an LDAP server's schema contain classes for the types of records that LDAP clients will request.

The RFC 2307 standard published by the Internet Engineering Task Force ("IETF") in March, 1988, helps to ensure interoperability among LDAP servers and their clients. It defines classes that must be present within a 2307-compliant LDAP server's schema. One of these classes is called "posixAccount", and is typically used as an auxiliary class when preparing a database schema containing standard classes for user records (a similar class, "posixGroup", is used for user group records). That is, the schema uses posixAccount as an auxiliary class to define classes that are instantiated to create user records in the directory server. Such records can be located in a search for posixAccount-type records, and contain posixAccount fields or attributes.

An RFC2307-compliant client can obtain user and group records from a 2307-compliant server by requesting posixAccount- or posixGroup-type records that exist in that server: user records, for example, or group records. Because those records are instantiated from a class that uses posixAccount as an auxiliary class, the client is guaranteed to find them when asking for posixAccount records in that branch.

LDAP servers, such as the widely-deployed Active Directory® ("AD") server by Microsoft Corporation, usually come with a default schema that can contain the records and support the operations needed for a basic computer network. For more complex networks, a network administrator may need to modify the default schema or even create a new schema. This is a disfavored option, however, because schema modification or replacement cannot be undone, is often disruptive to ongoing network operations, and requires high administrative privileges. Unfortunately, the alternative in many cases is to make extensive changes elsewhere in the complex network, or to abandon the attempt to consolidate identity data for the network within one LDAP server.

New approaches that permit identity data for complex networks to be maintained by an LDAP server, using the server's default schema, may be of value.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

In a network environment where several distinct sets of computers interoperate, each set may need to have user and group identity data maintained for users of the computers in the set. (Such sets of computers are called "zones" in this Specification.) To improve overall integration, it may be desired to add global user and group identity data that is valid on all computers, while preserving the per-zone identity data. In addition, it may be desired to provide access to both global and zone identity data to RFC2307-compliant clients, through a directory server such as Active Directory ("AD"), without altering the server's default schema. This can be achieved by augmenting or altering individual data records so that they can masquerade as, or stand in for, records of a desired type, when the schema does not ordinarily permit records of the type to be stored or associated in that way.

Figure 1:
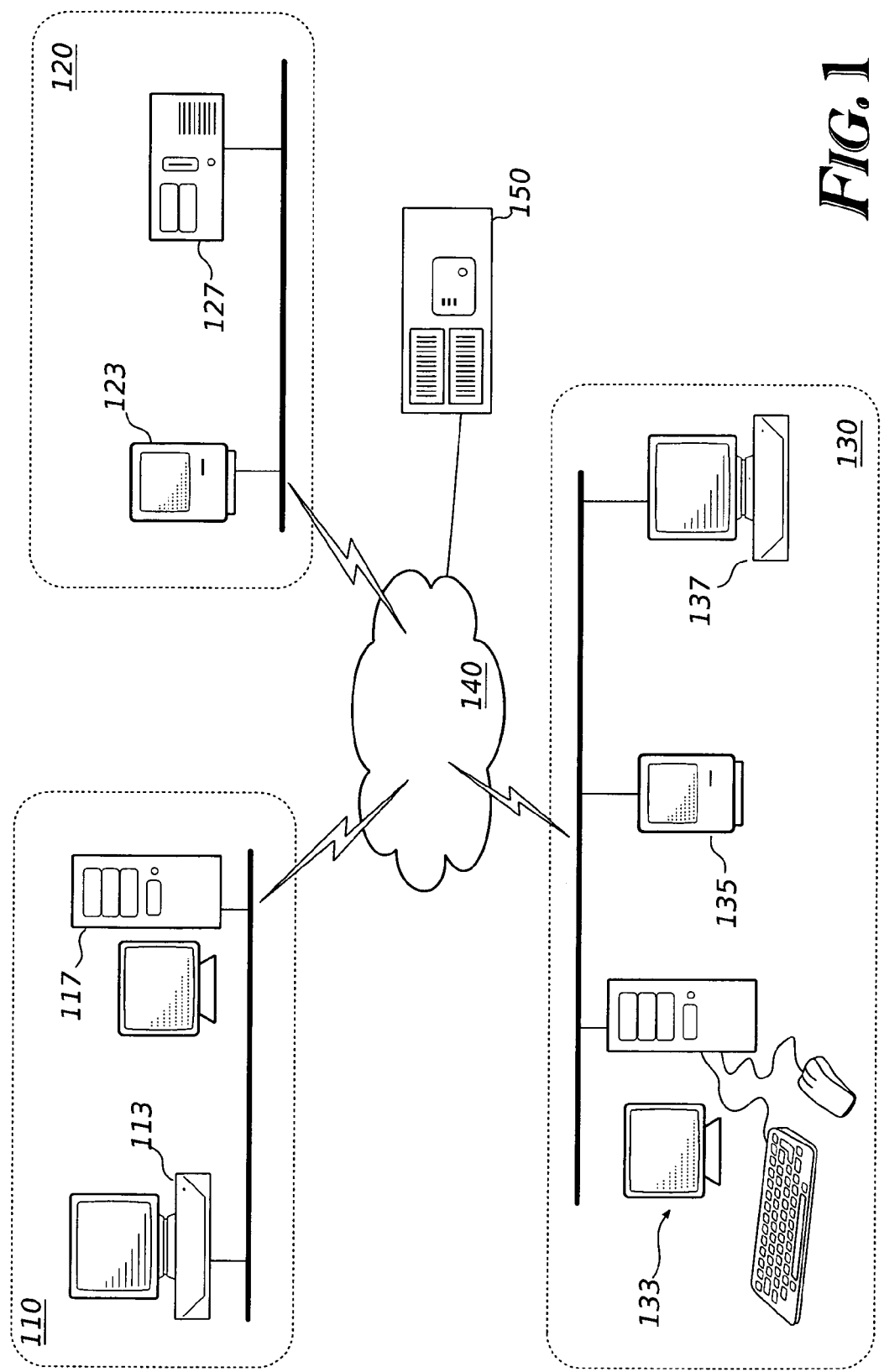
FIG. 1 shows a network with three zones and a directory server.

FIG. 1 shows a network with three zones, 110, 120 and 130. Each zone contains one or more computers 113, 117; 123, 127; 133, 135, 137. A transmission channel 140 interconnects all the zones. It will be apparent to those of skill in the relevant arts that transmission channel 140 may consist of several independent local- and/or wide-area data networks connected by routers or bridges (not shown). Embodiments of the invention work with computers grouped into logical zones. Two computers that are in close physical proximity or are connected to the same physical network may nevertheless be members of two different zones. A directory server 150 hosts a database containing identity and authorization records, and an LDAP server at the same machine presents a hierarchical view of the data in the database, responding to queries from various computers in the zone, the queries seeking identity and authorization data. In some embodiments, the database and LDAP server may be hosted on different machines; also, in larger networks, the database may be replicated across multiple machines and LDAP queries answered by several directory servers.

A multi-zone network like the one shown here may come into being when several individual networks that developed independently are consolidated under a single management authority. For example, consider separate networks of computers serving various departments of a university. A first group of computers may serve users in the Biology department, a second group may serve users in the Business department, and a third group may serve users in the Music department. When the networks are consolidated, an administrator may have several goals for the operation of the new, composite network: that users in the various departments be able to continue using their accustomed user identification information (e.g. usernames and passwords); that different users (in different departments) who happened to have identical user names or other identifying information not be required to change their information, and that users be able to access computers and resources in departments other than their "home" department.

Figure 2:
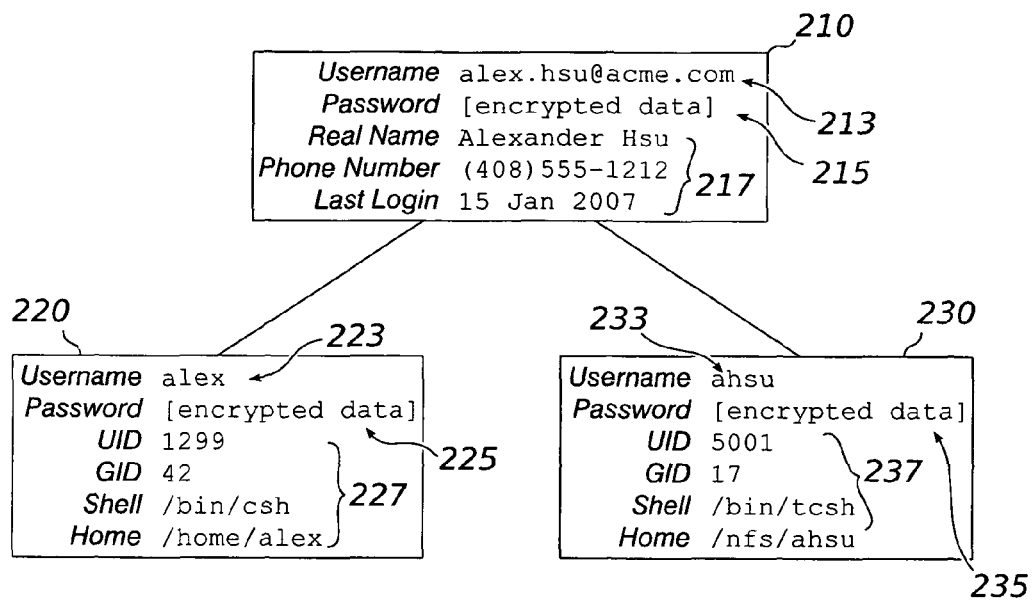
FIG. 2 shows a global user record and two associated zone user records.

A directory service to support these goals can be implemented through the data structures shown in FIG. 2. A global user record 210 is created for each user. The record contains a unique username 213 for the user, a password 215, and perhaps other data 217. Global user record usernames are unique.

Associated with each global user record are one or more zone records 220, 230, each of which contains identity information for the user that is valid within a particular zone. Each zone record contains a username 223, 233, a password 225, 235, and other data 227, 237. A user's username and/or password may differ from zone to zone, and either may be different from his global username and password. Within any single zone, usernames must be unique, but the same username may be associated with a different user in another zone. For example, the username "js" may be associated with someone named "John Smith" in a first zone, but with a different person named "Jane Steele" in a second zone.

Figure 3:
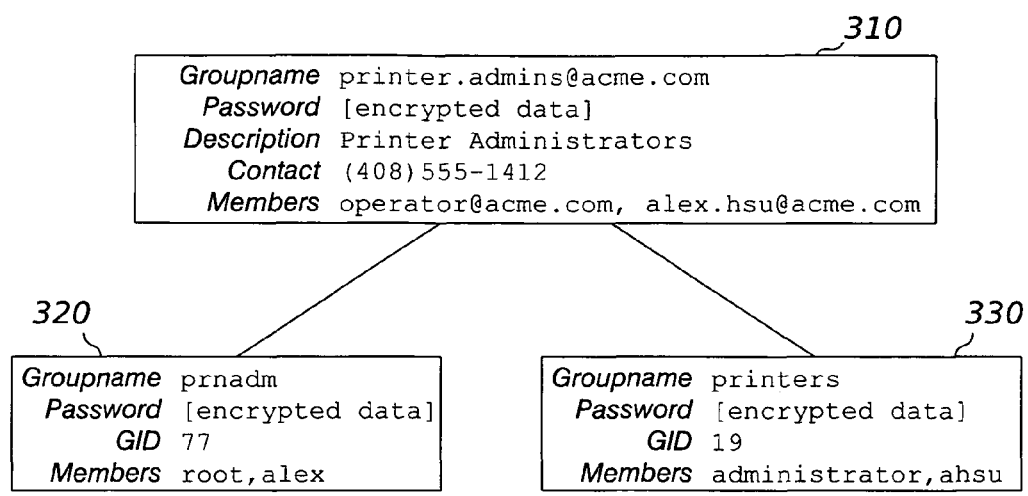
FIG. 3 shows a global group record and two associated zone group records.

A similar situation obtains with respect to user groups, as illustrated by FIG. 3. Groups of users within each zone may have identical names but different identification numbers (or vice versa), but a global group record 310 can correlate and organize the various zone group records 320, 330 so that conflicts and ambiguity are avoided.

Figure 4:
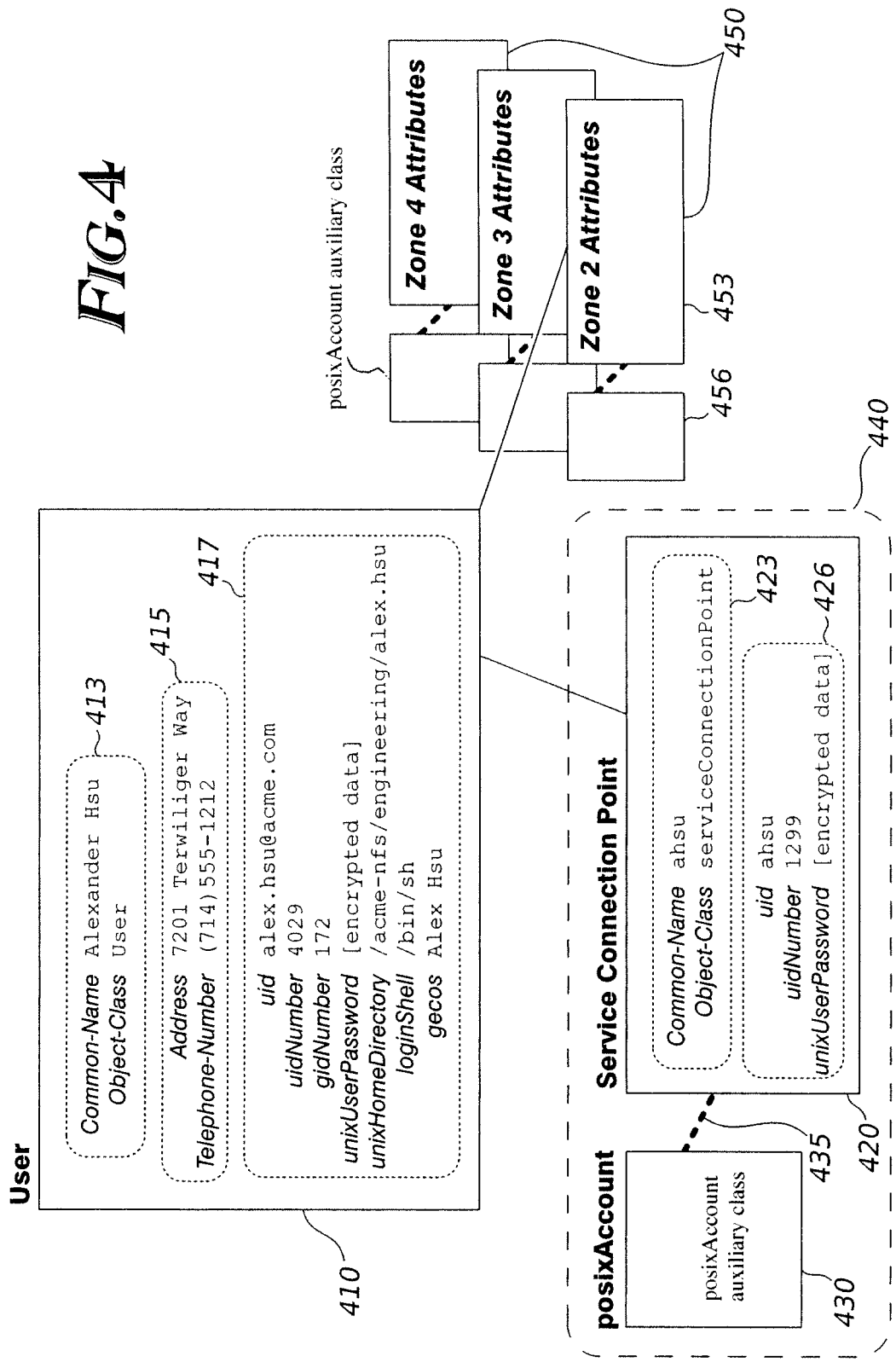
FIG. 4 shows details of global user record and zone user record types or classes.

Data records having the relationships shown in FIGS. 2 and 3 can be created and maintained within Active Directory using the default schema; FIG. 4 shows the record types that may be used. For a global user record 410, the "User" record type (containing mandatory attributes 413, optional attributes 415, and posixAccount-related attributes 417) is convenient, while a global group record (not shown) may be of type "Group". Both User and Group types are defined in the default AD schema as using posixAccount and posixGroup, respectively, for an auxiliary class, so global entity entries can be located and retrieved by an RFC2307 client.

Unfortunately, zone entity records to go with these global User and Group records cannot use the same User and Group types. The reason for this is two-fold: first, zone records associated with a global user or group record refer to the same individual (or group of users). Creating more than one User or Group record for the same individual or group violates LDAP standards. Second, the default AD schema lacks a "hook" or storage container by which the zone records (even if they were of type User or Group) could be associated with the global entity record. If the schema is not to be altered, some other type must be used for zone entity records, and this must be a type that can be associated with the global entity record in a one-to-many relationship, since each global entity record may be associated with several zone entity records.

In some embodiments of the invention, zone user records are of type Service Connection Point ("SCP"), as shown at 420. Records of this type can contain some of the information to be stored in a zone entity record (e.g. zone user name and password 426, zone-specific identification data, and so on), and User and Group records permit multiple SCP records to be associated with them. However, SCP record 420 is not descended from the posixAccount class, nor does it incorporate posixAccount as an auxiliary class (according to the default AD schema). Consequently, an RFC2307-compatible client would be unable to locate or use the zone user information in SCP 420.

Therefore, an embodiment of the invention augments SCP record 420 with a dynamically linked auxiliary class posixAccount 430 (dynamic link indicated by heavy dashed line 435). Global user record 410 may be associated with other zone user records 450, each of which is based on a Service Connection Point record 453 containing user information applicable to the corresponding zone, and has a dynamically linked posixAccount auxiliary class 456. The dynamically-linked auxiliary classes 430 and 456 augment the native type of zone user records 440 and 450, so that the records are responsive to an RFC2307-compliant client's query for records of type posixAccount.

Other embodiments may use a different class for zone user records, instead of Service Connection Point. For example, records created by instantiating the "resource" class have suitable characteristics as well. However, the dynamically linked auxiliary class posixAccount, or a derived class thereof, would still be required so that RFC2307-compatible clients can locate the zone user records.

Global group records and their associated zone group records are not shown in FIG. 4, but are constructed similarly: a global group record may be of type Group, and zone group records may be of type Service Connection Point, with posixGroup added as a dynamically linked auxiliary class.

Figure 5:
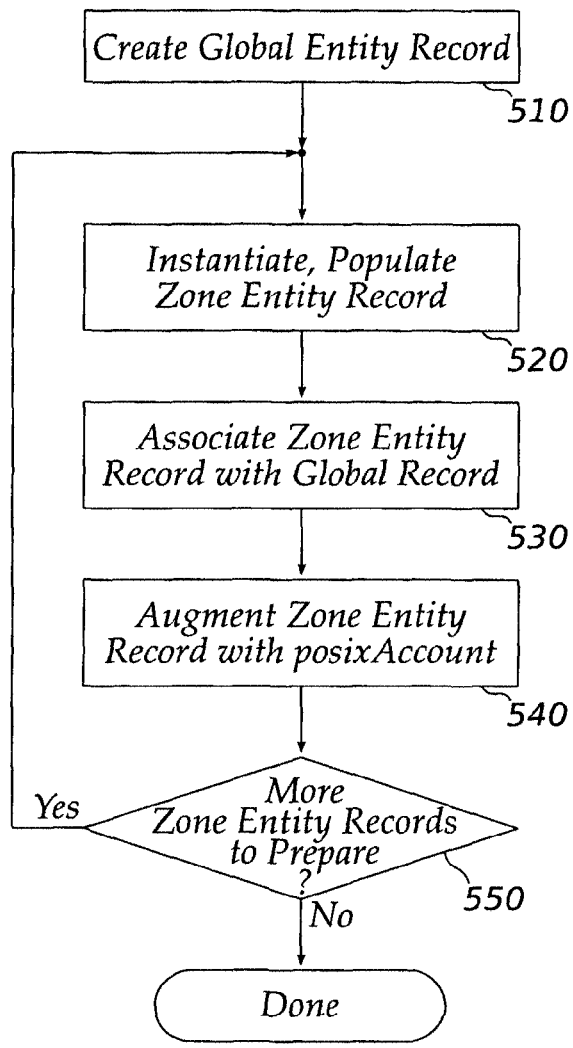
FIG. 5 outlines some operations of an embodiment of the invention.

FIG. 5 outlines how an embodiment of the invention can create a group of records like those shown in FIG. 2 or FIG. 3, in an LDAP database such as an Active Directory database. The method will be described with reference to global and zone user records (which are responsive to queries for posixUser-type records) but the method can easily be modified to create global and zone group records (which are responsive to queries for posixGroup-type records.)

First, an ordinary User record (a global entity record) is created (510). This record includes an entity identifier such as a user name that is unique among all global user records. The record type is descended from posixAccount, or uses posixAccount as an auxiliary class (the exact relationship is defined in the database's default schema) so that RFC2307 clients can find the record and make use of the information it contains.

Now, a zone entity record is instantiated and populated with data (520). The zone entity record's type is not descended from posixAccount, and does not incorporate posixAccount as an auxiliary class, so the zone entity record is not responsive to a query from an RFC2307 client for records of type posixAccount. The zone entity record's type is chosen so that it can be associated with the global entity record. The association permits a one-to-many relationship. That is, a global entity record can be associated with one or more zone entity records. In some embodiments the global entity record may be thought of as "containing" its zone entity records, in a container/contained relationship. In some embodiments, the zone entity record is of type Service Connection Point.

The zone entity record is associated with its global entity record (530). The association may be established by adding an attribute to the zone entity record that contains the distinguished name ("DN") of the global entity record. This association allows an administrative tool to find and manage the zone entity records associated with a global entity record, and also permits the global entity record to be found from any of the zone entity records.

The zone entity record is augmented individually (without any schema modifications) so that it becomes responsive to a query for a posixAccount-type record (540). In Microsoft's Active Directory, this augmentation can be accomplished by adding posixAccount type (or a descendent thereof) as a dynamically linked auxiliary class. To do this, any mandatory posixAccount attributes that are not present in the zone entity record are added, and then the name "posixAccount" is added to the ObjectClass attribute of the zone entity record. Now, although ordinary records of the same type as the zone entity record (e.g. Service Connection Point) are not responsive to a search for posixAccount-type records, the record instantiated in operation 520 is responsive. The dynamically linked auxiliary class permits the zone entity record to stand in for, or masquerade as, a record of type posixAccount. Thus, a computer or device that conforms to RFC2307 for performing user and group authentication, can find and use this zone entity record.

If there are any more zone entity records to be associated with the global entity record (550), an embodiment may repeat some of the foregoing operations to create those records. Otherwise, the next global entity record may be processed.

An embodiment can create global group records and zone group records in essentially the same way: a global record of type Group is created, then zone group records of a type unresponsive to a query for posixGroup are associated with the global record. Zone group records are augmented so that they become responsive to queries for posixGroup, for example by adding posixGroup (or a descendent thereof) to the zone group records as a dynamically linked auxiliary class.

An embodiment of the invention may be a machine-readable medium having stored thereon data and executable instructions which cause a programmable processor to perform operations as described above. In other embodiments, the operations might be performed by specific hardware components that contain hardwired logic. Those operations might alternatively be performed by any combination of programmed computer components and custom hardware components.

A machine-readable medium for storing information in a form readable by a machine (e.g., a computer), including but not limited to Compact Disc Read-Only Memory (CD-ROM), Read-Only Memory (ROM), Random Access Memory (RAM), and Erasable Programmable Read-Only Memory (EPROM).

The applications of the present invention have been described largely by reference to specific examples and in terms of particular allocations of functionality to certain hardware and/or software components. However, those of skill in the art will recognize that global and zone entity record structures can also be created and maintained by software and hardware that distribute the functions of embodiments of this invention differently than herein described. Such variations and implementations are understood to be captured according to the following claims.

I claim:

1. A method comprising:
    creating a global user record in a Lightweight Directory Access Protocol ("LDAP") database which is accessed and updated by a server, the global user record of a type responsive to an LDAP search for a posixAccount record;
    instantiating and populating a zone user record with data wherein the zone user record's type is chosen so that it is associatable with the global user record;

associating the zone user record with the global user record in the LDAP database, the zone user record of a type unresponsive to an LDAP search for a posixAccount record; and augmenting the zone user record of the type unresponsive to an LDAP search for a posixAccount record to cause it to become responsive to an LDAP search for a posixAccount record by a dynamically linked posixAccount or a derived class thereof, wherein the dynamically linked posixAccount or a derived class thereof permits the zone user record to appear to be a record of type posixAccount thereby becoming responsive to the LDAP search for a posixAccount.

2. The method of claim 1 wherein the LDAP database is a Microsoft Active Directory database.

3. The method of claim 1 wherein the global user record is a record of type User.

4. The method of claim 1 wherein the zone user record is a record of type Service Connection Point ("SCP").

5. The method of claim 1 wherein said associating comprises adding a distinguished name "(DN")" of the global user record as an attribute of the zone user record.

6. The method of claim 1 wherein said augmenting comprises:

adding any mandatory attributes of a posixAccount record that are missing from the zone user record; and adding a name "posixAccount" to an ObjectClass attribute of the zone user record.

7. A non-transitory computer-readable medium containing instructions and data to cause a programmable processor to perform operations comprising:

creating a User record in a Microsoft Active Directory ("AD") database;

instantiating and populating a second record with data wherein the second record's type is chosen so that is associatable with the User record and lacks posixAccount classification;

associating the second record that lacks posixAccount classification with the User record; and augmenting the second record of the type that lacks posixAccount classification with the User record with a dynamically-linked auxiliary class, the dynamically-linked auxiliary class to bestow posixAccount classification on the second record, wherein the dynamically linked auxiliary class permits the second record to appear to be a record having a posixAccount classification to cause the second record to become responsive to a search for a record having a posixAccount classification.

8. The non-transitory computer-readable medium of claim 7, containing additional instructions and data to cause the programmable processor to perform operations comprising:

receiving a Lightweight Directory Access Protocol ("LDAP") request from a client, the LDAP request to obtain data from a record of type posixAccount; and returning data from the second record to the client.

9. The non-transitory computer-readable medium of claim 7 wherein a type of the second record is Service Connection Point.

* * * * *